US012572385B2

(12) United States Patent
Malaya et al.

(10) Patent No.: US 12,572,385 B2
(45) Date of Patent: Mar. 10, 2026

(54) DYNAMIC SYSTEM POWER LOAD MANAGEMENT

(71) Applicants: ADVANCED MICRO DEVICES, INC., Santa Clara, CA (US); ATI TECHNOLOGIES ULC, Markham (CA)

(72) Inventors: Nicholas Penha Malaya, Austin, TX (US); Stephen Kushnir, Markham (CA); William C. Brantley, Austin, TX (US); Joseph L. Greathouse, Austin, TX (US)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 404 days.

(21) Appl. No.: 17/217,353

(22) Filed: Mar. 30, 2021

(65) Prior Publication Data
US 2022/0318056 A1 Oct. 6, 2022

(51) Int. Cl.
| | |
|---|---|
| *G06F 9/48* | (2006.01) |
| *G06F 1/28* | (2006.01) |
| *G06F 1/324* | (2019.01) |
| *G06F 1/329* | (2019.01) |
| *G06F 9/50* | (2006.01) |

(52) U.S. Cl.
CPC .............. *G06F 9/4893* (2013.01); *G06F 1/28* (2013.01); *G06F 1/324* (2013.01); *G06F 1/329* (2013.01); *G06F 9/505* (2013.01); *G06F 9/5094* (2013.01)

(58) Field of Classification Search
CPC .......................... G06F 1/329; G06F 9/46–5094
See application file for complete search history.

(56) References Cited

U.S. PATENT DOCUMENTS

| | | | | |
|---|---|---|---|---|
| 6,636,976 B1 * | 10/2003 | Grochowski | ......... | G06F 1/3203 |
| | | | | 713/320 |
| 2004/0255171 A1 | 12/2004 | Zimmer et al. | | |
| 2005/0081073 A1 * | 4/2005 | Williams | .............. | G06F 9/3836 |
| | | | | 712/E9.032 |
| 2012/0166854 A1 * | 6/2012 | Rotem | ...................... | G06F 1/28 |
| | | | | 713/340 |

(Continued)

FOREIGN PATENT DOCUMENTS

| | | |
|---|---|---|
| JP | 2013-539347 | 10/2013 |
| KR | 10-2018-0098904 | 9/2018 |

OTHER PUBLICATIONS

EmerGPU: Understanding and Mitigating Resonance-Induced Voltage Noise in GPU Architectures Renji Thomas, Naser Sedaghati and Radu Teodorescu (Year: 2016).*

(Continued)

*Primary Examiner* — April Y Blair
*Assistant Examiner* — Paul V Mills

(57) ABSTRACT

A method for reducing power variations resulting from changes in processor workload includes communicating a power dip condition to a workload scheduler of a processor device in response to identifying the power dip condition. One or more target power workloads are assigned for execution at the processor device based at least in part on the power dip condition. Further, each of the one or more target power workloads is associated with a known power load.

20 Claims, 4 Drawing Sheets

400

(56) References Cited

U.S. PATENT DOCUMENTS

| | | | | |
|---|---|---|---|---|
| 2014/0149677 | A1* | 5/2014 | Jayasena | G06F 12/0862 |
| | | | | 711/137 |
| 2014/0189399 | A1* | 7/2014 | Govindaraju | G06T 1/20 |
| | | | | 713/323 |
| 2016/0103691 | A1* | 4/2016 | Sethia | G06F 1/329 |
| | | | | 713/100 |
| 2016/0132096 | A1* | 5/2016 | Allen-Ware | G06F 1/3287 |
| | | | | 713/323 |
| 2017/0083066 | A1* | 3/2017 | Mahurin | G06F 1/3206 |
| 2017/0212563 | A1* | 7/2017 | Farazmand | G06F 9/5027 |
| 2017/0285710 | A1 | 10/2017 | Ardanaz et al. | |
| 2018/0101220 | A1 | 4/2018 | Mahindru et al. | |
| 2019/0034203 | A1* | 1/2019 | Ardanaz | G06F 1/266 |
| 2019/0087928 | A1* | 3/2019 | Forey | G06F 9/5038 |
| 2019/0088009 | A1* | 3/2019 | Forey | G06T 15/005 |
| 2019/0286214 | A1* | 9/2019 | Pabalkar | G06F 1/3228 |
| 2020/0073470 | A1* | 3/2020 | Ernewein | G06F 1/324 |
| 2020/0097061 | A1* | 3/2020 | Ostby | G06T 1/20 |
| 2021/0209717 | A1* | 7/2021 | Du | G06T 1/20 |
| 2022/0269298 | A1* | 8/2022 | Rapaka | G06F 9/4893 |

OTHER PUBLICATIONS

Voltage Smoothing: Characterizing and Mitigating Voltage Noise in Production Processors via Software-Guided Thread Scheduling Vijay Janapa Reddi, Svilen Kanev, Wonyoung Kim, Simone Campanoni, Michael D. Smith, Gu-Yeon Wei, David Brooks (Year: 2010).*

Control Techniques to Eliminate Voltage Emergencies in High Performance Processors Russ Joseph, David Brooks, Margaret Martonosi (Year: 2002).*

Pipeline Damping: A Microarchitectural Technique to Reduce Inductive Noise in Supply Voltage Michael D. Powell and T. N. Vijaykumar (Year: 2003).*

Static Analysis for GPU Program Performance Nimit Singhania Chapter 2 (Year: 2018).*

Dynamically Finding Optimal Kernel Launch Parameters for CUDA Programs Taabish Jeshani Chapters 1 and 2 (Year: 2023).*

GPU Programming Madan Musuvathi Lecture slides University of Washington Computer Science and Engineering CSE P 506—Concurrency (Spring 2011) Retrieved: courses.cs.washington.edu/courses/csep506/11sp/Home.html (Year: 2011).*

The Mine of Information—Graphics Card Interface Simon Kitching retrieved: moi.vonos.net/linux/graphics-card-interfaces/ (Year: 2012).*

Overview of the HPC Challenge Benchmark Suite Jack J. Dongarra and Piotr Luszczek (Year: 2006).*

Evaluation of Power Management Control on the Supercomputer Fugaku Yuetsu Kodama, Tetsuya Odajima, Eishi Arima and Mitsuhisa Sato (Year: 2020).*

International Search Report and Written Opinion mailed Jul. 8, 2022 for PCT Application No. PCT/US2022/021493, 12 pages.

International Preliminary Report on Patentability issued in Application No. PCT/US2022/021493, mailed Oct. 12, 2023, 7 pages.

Extended European Search Report mailed Jan. 7, 2025 for European Application No. 22781905.9, 9 pages.

* cited by examiner

100

402 — RECEIVE POWER FLOOR INSTRUCTIONS

404 — POWER LOAD BELOW POWER FLOOR INSTRUCTION?

N

Y

406 — SCHEDULE PRODUCTIVE WORKLOADS

REPEAT

408 — NOTIFY WORKLOAD SCHEDULER / CP OF POWER DIP CONDITION

410 — SUBMIT TARGET POWER WORKLOADS TO GENERATE DYNAMIC POWER BURN

REPEAT

DYNAMIC SYSTEM POWER LOAD MANAGEMENT

BACKGROUND

The generators and loads in an electrical power network are often connected through distribution units and a transmission network, with the generators operating in parallel to continuously supply power loads through networks of transmission lines (e.g., the electric grid). Electrical energy balance between generation and consumption is important for power system operation. To accommodate changes in power demand, the power system is equipped with power generation and flow control devices throughout the transmission network and the generators (e.g., an excitation system, governor, and regulating transformers). These devices help to maintain voltage, frequency and other system variables within values defined by conventional power generation standards.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

As the scale of datacenter and high-performance computing (HPC) system workloads grows, rapid or large variations in power load begin to impact the stability of energy systems. Full-scale workloads, such as workloads used in machine learning training applications, sometimes include periods of heavy power loads on devices followed by periods where the same devices are idle. For example, parallel computing workloads often include periods of synchronized high-powered computation (on the order of seconds) and low-powered communication of computed results (on the order of seconds). These system-wide power swings (which can be on the magnitude of megawatts power over the course of a few seconds of time or fractions of a second) resulting from rapid changes in power demand risk damaging local power transformers, system circuitry, and also up-stream power transformers and generators.

To address these problems and to enable improved system performance, FIGS. 1-4 describe systems and methods for reducing power variations resulting from changes in processor workload to ensure the power load demanded by a large-scale computing system (e.g., and HPC system) has less variation over time. In various embodiments, methods of system power load management include monitoring, by a power monitor of a processor device, of a power draw by the processor device. A condition signal is communicated to a workload scheduler after the power monitor determines, based on monitoring the power draw, that a power dip condition exists. The workload scheduler assigns, based at least in part on the power dip condition signal, one or more target power workloads for execution at the processor device. Each of the one or more target power workloads is a precompiled kernel for execution at a known power load. In this manner, the processor device itself smooths out potentially damaging high frequency variations in power use by leveraging existing processor hardware structures, without additional circuitry design changes, and without changes to the structure of productive workloads.

Figure 1:
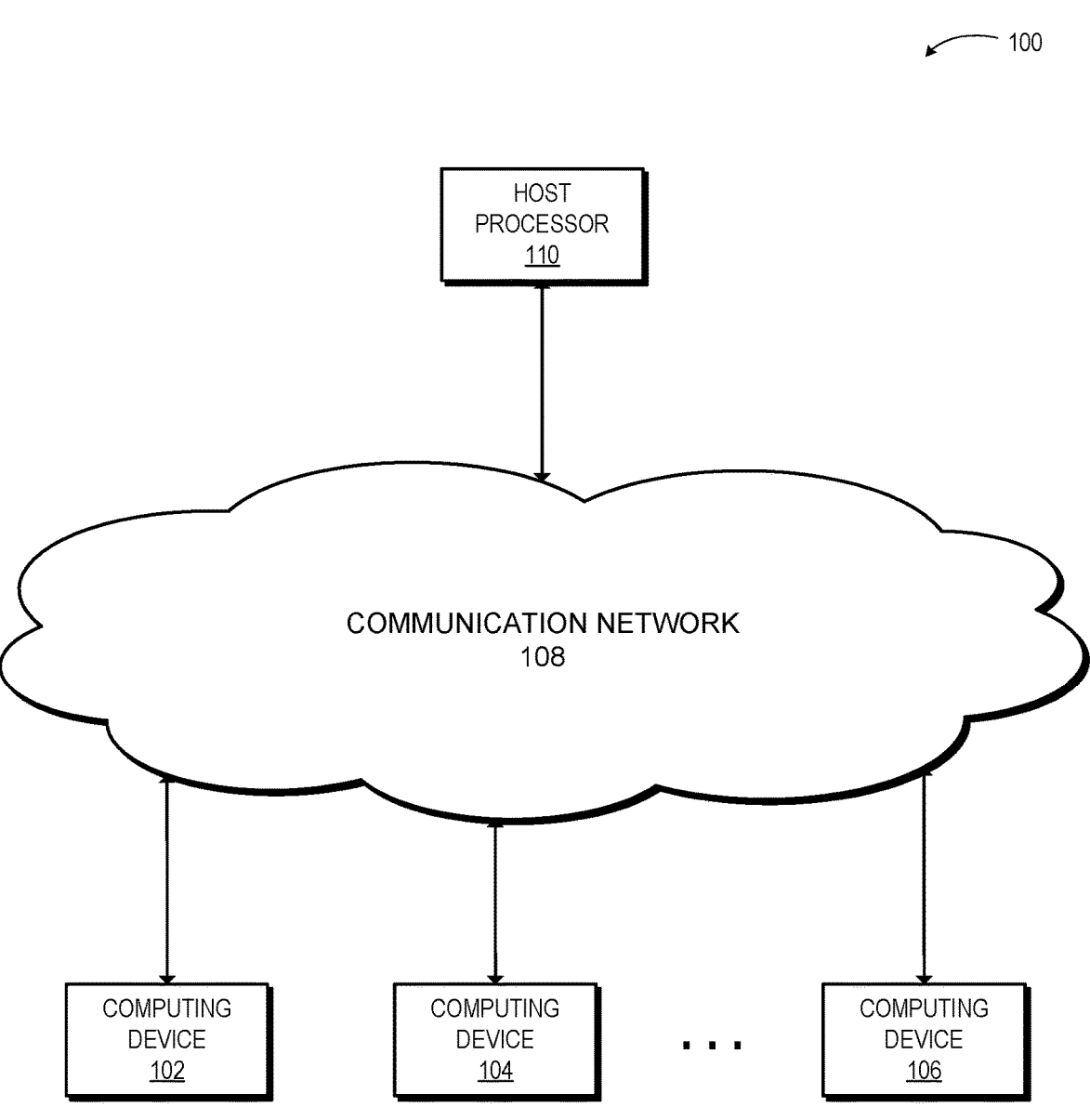
FIG. 1 is a block diagram of a computing system implementing dynamic system power load management in accordance with some embodiments.

FIG. 1 illustrates a block diagram of one embodiment of a computing system 100 implementing a dynamic system power load management in accordance with some embodiments. In some embodiments, the computing system 100 is a distributed computing system includes multiple computing devices 102, 104, and 106 (e.g., servers, mobile devices, and the like) that are connected to each other via a communication network 108. Each of the computing devices 102-106 includes processing and memory storage capabilities. In one embodiment, the computing system 100 is contained within a single physical enclosure, and the communication network 108 is a bus or system interconnect connecting the computing devices 102-106 within the enclosure. For example, in various embodiments, the computing devices 102-106 includes processing units such as graphics processing units (GPUs), central processing units (CPUs), field programmable gate arrays (FPGAs), and the like on the same board or on separate carrier boards that are connected to each other via a backplane. In some embodiments, the system 100 is a heterogeneous system including multiple different processing units (which may be CPUs, GPUs, ASICs, and the like).

In some embodiments, the components in the computing system 100 are contained in separate physical enclosures and are geographically distributed. For example, in various embodiments, the computing devices 102-106 represent individual servers, personal computers, mobile devices, etc. that are connected to each other via a wide-area network (WAN) such as the Internet, a local-area network (LAN), wireless network, or other communication network 108. In one embodiment, the computing devices 102-106 represent the same type or similar types of devices; alternatively, the computing devices 102-106 are different types of devices. In various embodiments, to support execution of instructions for graphics and other types of workloads, the computing system 100 also includes a host processor 110, such as a central processing unit (CPU). In various embodiments, each of computing devices 102-106 includes one or more processors such as a parallel processor (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). It is noted that the number of components of computing system 100 vary in some embodiments. It is also noted that in some embodiments computing system 100 includes other components not shown in FIG. 1. Additionally, in other embodiments, computing system 100 is structured in other ways than shown in FIG. 1.

As will be appreciated, there are numerous techniques for dealing with power swings (e.g., di/dt-induced voltage spikes and droops) at an individual board level and over relatively short periods of time, including clock-stretchers to deal with voltage droops, issue-rate limiting to prevent current spikes, peak current control circuits to reduce frequency, and analog RLC networks to smooth power input to the chip. Such techniques generally work only on short time granularities and at smaller-than-datacenter levels of scale. However, rapidly varying power levels within seconds or sub-second time frames, such as due to a job failing unexpectedly or due to low power regions of a computational run (e.g., post-processing) introduces high frequency variations from an otherwise high-power workload. Conventional power management strategies such as installation of energy storage devices (e.g., connecting a capacitor to the DC supply or diverting excess power by pumping water up hill) allows for filtering of power load variations for short periods. However, such mitigation strategies require large capital expenses and only works for narrow ranges of time periods.

Conventionally, prevention of power spikes is achieved by preventing a processor from reaching its maximum frequency or not allowing workloads to use all the cores in the processor until sufficient time has passed. However, preventing power dips is a more difficult task for processors—if there is no work to do, there is a limit to how much dynamic power a circuit can consume. Avoiding transitions into sleep states only raises a minimum power consumed, but may not result in the same active and idle power usage. In addition, it is difficult to prevent large dips in power consumption (resulting from dip in current as computations end, causing voltage spikes) as even higher power states cannot easily maintain a similar amount of dynamic power usage as a fully loaded processor (e.g., having a 500 W GPU board drawing maximum power for seconds or minutes after the GPU chip becomes idle and stops processing productive workloads would be difficult).

Accordingly, as described in more detail with respect to FIGS. 2-4 below, in various embodiments, one or more of the individual computing devices 102-106 utilizes a more constant power load and reduces variation in power draw by maintaining some minimum power usage, whether when the processors are idle or when they are running some low-power workloads. By forcing the processors on any individual node in a full system to sit at an elevated power level above idle for specified time periods, the devices are prevented from moving to sleep states and their power sits at an elevated level above that attained at awake-but-idle. It should be recognized that although various embodiments are described below in the particular context of a GPU for ease of illustration and description, in various embodiments, the concepts of executing power burn kernels for reducing power variation is applicable to any processor without departing from the scope of this disclosure. For example, in various embodiments, the concepts described here is also similarly applicable to other processors including accelerated processing units (APUs), discrete GPUs (dGPUs), artificial intelligence (AI) accelerators, other parallel processors, central processing units (CPUs), and the like.

Figure 2:
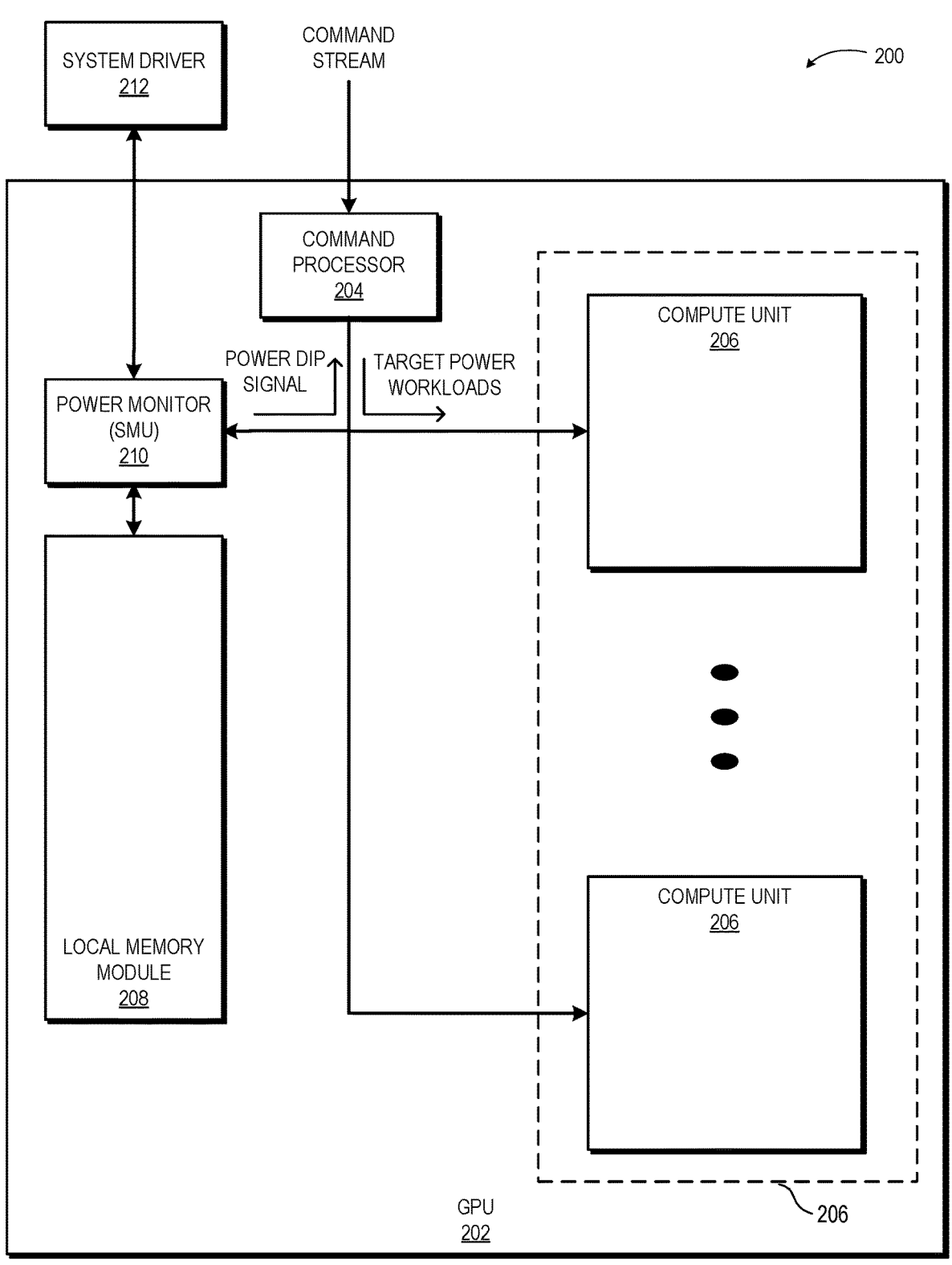
FIG. 2 is a block diagram of an example of a graphics processing unit for utilizing dynamic system load power management in smoothing system power usage in accordance with some embodiments.

Referring now to FIG. 2, illustrated is a block diagram illustrating dynamic system load power management for smoothing system power usage at a GPU in accordance with some embodiments. As shown, the GPU 202 includes a command processor 204 that receives commands in a command stream from, for example, a corresponding device driver (not shown) and coordinates processing within the GPU 202. In various embodiments, the device driver includes software, firmware, hardware, or any combination thereof. In various embodiments, the device driver is implemented entirely in software. The device driver provides an interface and/or application programming interface (API) for communications access to the GPU 202.

The GPU 202 includes a plurality of compute units (CUs) 206 that are generally configured to execute sets of instructions (e.g., computer programs) that manipulate the circuitry of the GPU 202 to carry out defined tasks. The CUs 206, a set of fixed function units, or a combination thereof, execute instructions concurrently or in parallel. In some embodiments, the GPU 202 includes tens or hundreds of compute units or fixed function units for executing instructions. In various embodiments, the GPU 202 also includes a local memory 208 (e.g., on-chip RAM) for storing register data, storing workload code, and the like.

In various embodiments, the GPU 202 also implements various system monitoring and power saving functions. In particular, one system monitoring function is power usage monitoring. For example, in some embodiments, the GPU 202 includes a microcontroller 210 such as a system management unit (SMU) that is configured for enforcing numerous protection mechanisms (e.g., chip-wide and device block thermal constraints, di/dt (rate of change of the charge current (i) over time (t)) limits, voltage droop mitigation, etc.), in addition to performing a plethora of dynamic performance optimizations. Techniques for implementing and operating SMU microcontrollers 210 are known in the art and in the interest of clarity only those aspects of implementing or operating the SMU microcontroller 210 that are relevant to the claimed subject matter are discussed herein.

The SMU microcontroller 210 includes hardware and firmware for managing and accessing system configuration and status registers and memories, generating clock signals, controlling power rail voltages, and enforcing security access and policy for the GPU 202. The SMU 280 is a local controller that synchronizes communication and controls operations of resources at the GPU 202. In various embodiments, the SMU microcontroller 210 includes one or more clock sources not shown in FIG. 2, such as a phase locked loop (PLL), to provide clock signals for components of the GPU 202. The SMU microcontroller 210 also manages power for various process, other functional blocks, assesses workload characteristics to enable optimal allocation of platform power, and in various embodiments receives measured power consumption values to determine appropriate power states.

In various embodiments, a job scheduler (not shown) or other management tool communicates a power floor and a unit of time that the power floor should be maintained via a system driver 212. The system driver 212 communicates the power floor and unit of time information to the SMU 210 through a number of techniques such as memory-mapped input/output (MMIO) or in-memory mailboxes. The SMU microcontroller 210 monitors a power usage of the GPU 202 over a period of time (e.g., on a short granularity, such as a millisecond or shorter). If the SMU 210 (or other power monitoring firmware at the GPU 202) observes that power utilized by the GPU 202 dips below the power floor over the specified period of time (e.g., di/dt time rate of change of current consumption, such as over a few milliseconds), the SMU 210 notifies the command processor 204 of a power dip condition via, for example, an on-device wire, message routed over an on-chip SOC fabric, writing a signal into a shared memory location, and the like.

The command processor 204, upon receiving a power dip condition signal 212, launches target power workload(s) to the CUs 206. As described in more detail below, target power workloads are designed to burn predetermined, fixed amounts of power to enable reaching and maintaining a target power draw. As will be appreciated by those skilled in the art, in some embodiments, the GPU 202 should not continue its previous workload that was running prior to the SMU 210 detecting the power dip condition. Although the previous workload may maintain a particular power level, such computations risk generating unintended answers and ruining the results of previous computations if intermingled. Instead, the target power workloads produce meaningless results that are discarded after serving their purpose of performing dynamic work and causing the GPU 202 to consume power. In other embodiments, the GPU 202 continues its previous workload that was running prior to the SMU 210 detecting the power dip condition and the target power workload runs on remaining space at the GPU 202 device at the same time. For example, in some devices, it is possible to have multiple kernels on the device simultaneously, and the target power workload would only require the original workload to leave if there is insufficient room on the device to run the target power workload.

The system driver 212 communicates information regarding one or more target power workloads including pre-compiled kernels of known power load (such as double-precision matrix-matrix multiplication (DGEMM) kernels) and stores the target power workload code at the local memory module 208 of the GPU 202. In various embodiments, the system driver 212 reserves memory locations at the local memory module 208 for storing that target power workload code and further identifies commands that GPU firmware (e.g., command processor 204) needs for running target power workloads. The command processor 204 thus knows an amount of power 'burned' (e.g., power consumed performing kernels of target power workload at particular voltage-frequency states). In various embodiments, the device driver prepares a plurality of different kernels tuned to various dynamic power usages. For example, in one embodiment, the device driver includes five different kernels of target power workload that are designed to burn 100 W, 200 W, 300 W, 400 W, and 500 W of power on the target design of the GPU 202.

When the job scheduler (not shown) or management tool communicates the power floor information to the driver 212, the driver 212 communicates the power floor to the SMU 210. Additionally, the driver 212 informs the command processor 204 of this new kernel that it should run to burn power during idle scenarios to target particular power levels. As will be appreciated, the target power workload includes workload(s) that burn particular amounts of power at various levels and generally only burn the required amount of power at a particular voltage-frequency state. In various embodiments, the SMU 210 instructs the GPU 202 to operate at that known power burn voltage-frequency point when the SMU 210 notifies the command processor 204 to begin processing target power workloads.

In some embodiments, the computational resources of the GPU 202 (e.g., CUs 206) may be scheduled performing low-power work for a particular time. In such circumstances, the GPU 202 would be unable to additional higher-powered workloads such as the target power workload. To prevent this, the command processor 204 is informed that it is running in an environment where a power floor may be needed in the future. In some embodiments, this notification occurs when the power floor is communicated to the SMU 210. In other embodiments, this anticipated power floor notification is communicated as a separate command (e.g., by the driver) at boot time or at some other point in time. The command processor 204 (or other layers of the design such as the ADC, SPI, or software stack) then limits a maximum amount of work scheduled at the GPU 202 device to ensure that there is space to run power burn kernels, such as by using CU masking, or through limiting the maximum number of VGPRs or wave slots available to user software when in such an anticipated power floor scenario.

In various embodiments, after a pre-determined period of time, the SMU 210 requests the command processor 204 to stop the power-burn, target power workload (e.g., through sending wave-kill commands), so that the SMU 210 is able to reassess whether power usage again dips below the power floor. In some embodiments, the system driver 212 defines and communicates to the SMU 210 an amount of time that the SMU 210 needs to ensure that the power floor is maintained subsequent to a power dip condition. If power usage again tries to dip below the power floor, the SMU 210 then instructs the command processor 204 to again launch more power burn work.

Additionally, it is not necessary to indefinitely perform target power workloads for the purposes of power burn. In some embodiments, the command processor 204 and the SMU 210 gradually decrease power usage by running a first power burn kernel of a higher power usage (e.g., a target power workload designed to power burn at 500 W) for a first period of time, switching to a second power burn kernel of a lower power usage (e.g., a target power workload designed to power burn at 400 W), and so forth, thereby decreasing the amount of power consumed by GPU 202 over time. In other embodiments, the SMU 210 and command processor 204 instruct the CUs 206 to process the same target power workload while walking down the voltage-frequency points at which the GPU 202 operates (e.g., gradually decreases power usage by running the same power-burn kernel), such as by utilizing power management techniques including dynamic voltage and frequency scaling (DVFS) to dynamically adjust an operating voltage and frequency point (referred to as a "p-state") across GPU 202 components during run time.

In this manner, the GPU 202 hardware autonomously starts running power burn workloads when the hardware itself detects changes in power usage falling below the predetermined power floor threshold. Power demand is monitored so that extra power can be consumed (via running of target power workloads) to smooth out power usage or reduce high frequency variations in power draw. Thus, processors on any individual node (e.g., a single GPU) in a full system are instructed to operate at an elevated power level above GPU idle for specified time periods. In this manner, devices are prevented from moving to sleep states and their power sits at an elevated level above that attained at awake-but-idle. The full system power load can thus be gradually raised or lowered.

Although described with respect to FIG. 2 in the context of firmware-driven power controllers and firmware-driven workload managers, those skilled in the art will recognize that the concepts disclosed herein are applicable to other implementations including software-based or hardware-circuitry-based (e.g., hardware state machines) monitoring and smoothing of power variations. For example, in various embodiments, the workload scheduler logic is implemented at least in part at a host processor driver or at a processor core external to the GPU 202. Additionally, although described with respect to FIG. 2 in the context of a GPU 202 device, those skilled in the art will recognize that the concepts disclosed herein are applicable to various processors, including datacenters with heterogeneous system architectures (HSA) where compute systems are expected to be used for a variety of compute intensive models using combinations of any of the following: CPUs, GPUs, FPGAs, custom ASICs, and the like.

Figure 3:
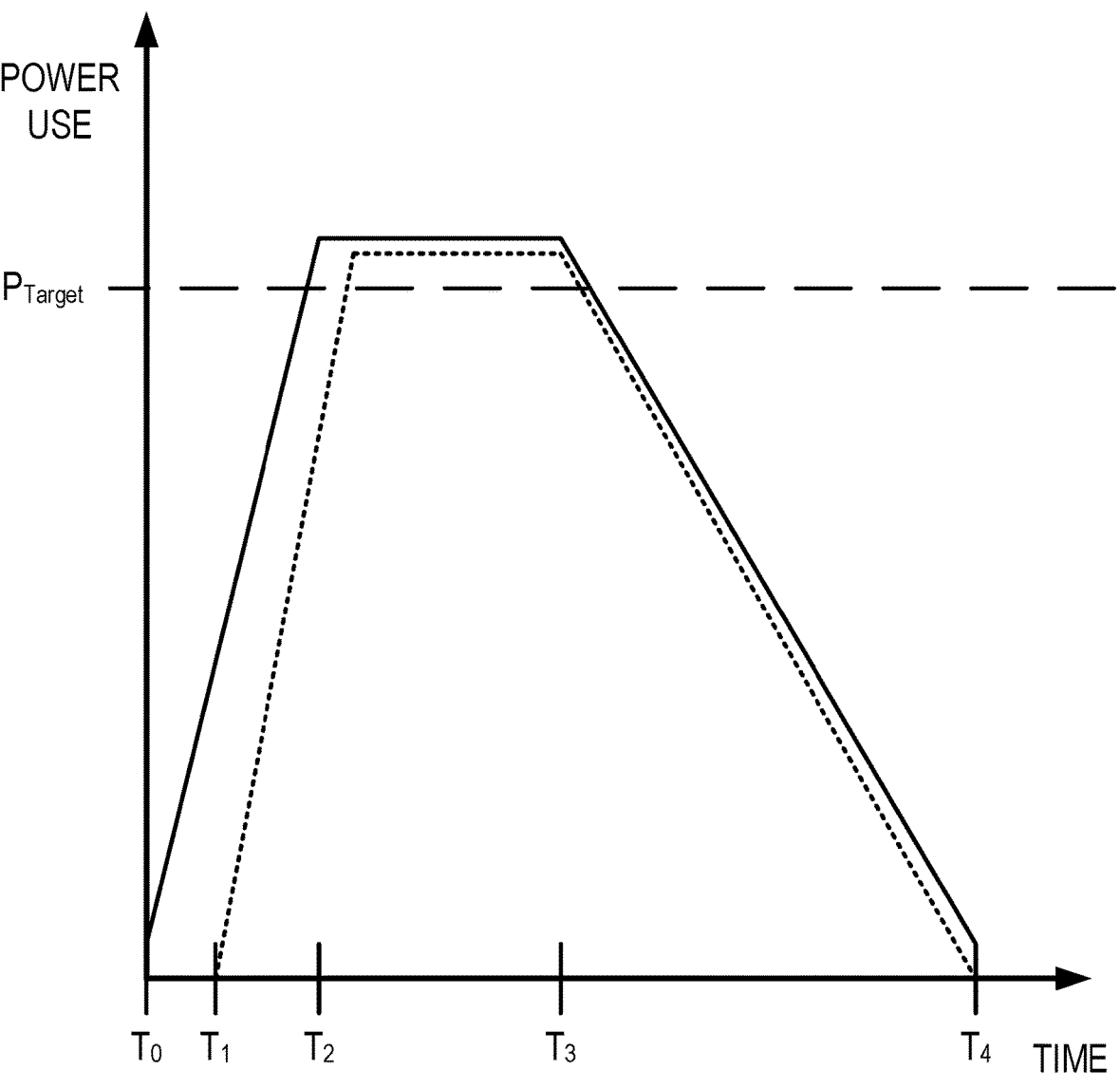
FIG. 3 is a plot of power drawn by a processing device as a function of time during execution of target power workload in accordance with some embodiments.

FIG. 3 is a plot 300 of power drawn by a processing device as a function of time during execution of target power workload in accordance with some embodiments. The vertical axis indicates the total power drawn by a processing device (such as GPU 202 of FIG. 2) in arbitrary units and the horizontal axis indicates the time increasing from left to right in arbitrary units. Some embodiments of the plot 300 correspond to power drawn by the GPU 202 while executing one or more target power workloads after detecting a power dip condition such as previously described in more detail with respect to FIG. 2

At time=$T_0$, the processing device is in a low power draw state due to, for example, computations for a previous productive workload ending and causing power draw by the processing device to fall below a threshold power floor level (labeled as $P_{target}$ in FIG. 3).

At time=$T_1$, the power monitor of the processing device (e.g., SMU 210 or other power monitoring firmware at the GPU 202 of FIG. 2) detects the power dip condition by observing that power utilized by the GPU 202 dips below the power floor over a specified period of time (e.g., di/dt time rate of change of current consumption, such as over a few milliseconds). Accordingly, the SMU 210 notifies the command processor 204 of the power dip condition and the command processor 204 begins launching target power workloads (precompiled kernels for execution to generate dynamic work by producing results to be discarded for the purposes of burning power) to the CUs 206. Power draw contribution related to the executing target power workloads is indicated by the dotted lines.

At time=$T_2$, sufficient quantities of target power workloads have been started for execution at the GPU 202 such that overall power draw by the processing device now exceeds the threshold power floor level. For example and with respect to FIG. 2, in various embodiments, the command processor 204 is capable of launching multiple different kernels of target power workload (e.g., designed to burn 100 W, 200 W, 300 W, 400 W, and 500 W of power) on the design of the GPU 202 and for targeting particular target power usage levels. In various embodiments, the SMU 210 instructs the GPU 202 to operate at that threshold power floor level until the command processor 204 is instructed to begin processing productive workloads.

At time=$T_3$, it is not necessary to indefinitely perform target power workloads for the purposes of power burn in some embodiments. Accordingly, the command processor 204 and the SMU 210 gradually decrease power usage by running a first power burn kernel of a higher power usage (e.g., a target power workload designed to power burn at 500 W) for a first period of time, switching to a second power burn kernel of a lower power usage (e.g., a target power workload designed to power burn at 400 W), and so forth such as to decrease the amount of power consumed by GPU 202 over time. In other embodiments, the SMU 210 and command processor 204 instruct the CUs 206 to process the same target power workload while walking down the voltage-frequency points at which the GPU 202 operates (e.g., gradually decreases power usage by running the same power-burn kernel), such as by utilizing power management techniques including dynamic voltage and frequency scaling (DVFS) to dynamically adjust an operating voltage and frequency point (referred to as a "p-state") across GPU 202 components during run time. In this manner, the overall power draw by the processing device is gradually lower between time=$T_3$<T<$T_4$ at a rate determined to appropriate (e.g., for avoiding generating current dips, power dips, and voltage spikes that system hardware are incapable of handling).

Figure 4:
FIG. 4 is a flow diagram of a method for performing dynamic system load power management in accordance with some embodiments.

FIG. 4 is a flow diagram of a method 400 of performing dynamic system load power management at a processing device for smoothing system power usage in accordance with some embodiments. For ease of illustration and description, the method 400 is described below with reference to and in an example context of the system 100 and GPU 202 of FIG. 1 and FIG. 2. However, the method 400 is not limited to these example contexts, but instead in different embodiments is employed for any of a variety of possible system configurations using the guidelines provided herein.

The method 400 begins at block 402 with the receiving, by a parallel processor such as a graphics processing unit (GPU), of a power floor instruction. In some embodiments, the power floor instruction is a user setting specifying a minimum power level (e.g., power floor) that the GPU should use (e.g., per GPU device in a multi-device system), such as power the GPU consumes under load. For this first mode of operation, the user setting specifies a power (per device or across the system scale), such as a job scheduler (e.g., SLURM), as a system configuration, on each device through system management interface tools like rocm-smi (which directly communicate with an OS kernel driver), and the like. In other embodiments, the power floor instruction is a user setting that does not specify particular target power usage levels but instead specifies the rate at which power usage of the GPU changes over a period of time. For example, in some embodiments, the power floor instruction includes a predetermined di/dt rate of change. This information is then provided to each of one or more processing devices (which may be CPUs, GPUs, ASICs, and the like) so they have a corresponding target power draw (or 'power load' as used interchangeably throughout this disclosure). That is, the GPU receives descriptions of much power a kernel burns (at various voltage and frequencies) such that firmware (e.g., command processor 204) knows which kernel to run at various voltage and frequency points to target prevention of dips in power.

In some embodiments, the power floor instruction includes an absolute power usage level (e.g., numerical power load target for the GPU in watt units) set by an outside manager, such as to control individual device and/or entire system power usage (e.g., at a datacenter level). For example, each device or chip within a system (e.g., system 100 of FIG. 1) may be assigned its own power floor or di/dt limit. In such circumstances, if those limits are individually controllable, then external entities could coordinate various power usages amongst a plurality of those devices or chips. The devices are be permitted to schedule jobs and work as normal, such as via command processor 204 of FIG. 2 assigning kernels to a GPU's compute units.

The method 400 continues at block 404 with the monitoring, by a power monitor of a graphics processing unit (GPU), of a power load on the GPU to determine whether the GPU experiences a dip below the power floor specified by the power floor instruction of block 402. For example, such as illustrated in FIG. 2 with respect to the SMU 210, the SMU 210 receives a power floor instruction including a power floor level and unit of time information from the system driver 212. The SMU 210 monitors a power usage of the GPU 202 over a period of time (e.g., on a short granularity, such as a millisecond or shorter) to determine whether power load on the GPU 202 dips below the power floor level over the specified period of time (e.g., di/dt time rate of change of current consumption, such as over a few milliseconds).

In some embodiments, each of one or more device (e.g., a GPU 202 of FIG. 2) includes a control system by which power and compute loads are monitored and varied to enable reaching and maintaining a target power draw in accordance with a user specified threshold power level and/or rate of change in power usage. In other embodiments, the device (e.g., a GPU 202 of FIG. 2) attempts to keep its power relatively constant regardless of a single user-specified power floor. For example, and with reference to FIG. 2, the SMU 210 or an off-die power monitor observes an amount of power that the GPU 202 has used over a pre-determined amount of time in the past. If the SMU 210 sees a dip in that power usage past a threshold level, the SMU 210 then instructs which of the multiple different power-burn kernels the command processor 204 should launch for scheduling additional work, such as described in more detail below.

If the power monitor determines at block 404 that a power change remains above a predefined power floor level over time, the devices continue to schedule jobs and work as normal (referred to as 'productive work') at block 406 via a workload scheduler, such as via the command processor 204 assigning kernels of productive work to the compute units 206 of GPU 202 (or OS workflow manager/OS scheduler in the context of CPUs). However, if the power monitor determines at block 404 that power change causes a dip below a predefined power floor level over time, the method 400 proceeds to block 408 where the power monitor (e.g., SMU 210 of FIG. 2) notifies the workload scheduler (e.g., command processor 204 of FIG. 2) of a power dip condition via, for example, an on-device wire, message routed over an on-chip SOC fabric, writing a signal into a shared memory location, and the like.

At block 410, based on receiving the power dip condition signal from the command processor 204 submits work to target a certain power load, whether that is at the previous level or a floor level. A workload scheduler (such as the command processor) is provided with a plurality of power burn kernels of known power draw (e.g., target power workloads). In some embodiments, a target power workload includes an idle power burn kernel used when there is no driver-initiated productive workloads. In various embodiments, only a single instance of the idle power burn kernel is run at any given time. Additionally, a target power workload also includes an active power burn kernel that is run concurrently with drive-initiated productive workloads. Any number of active power burn kernels may be run concurrently, subject to the limits of the device.

In various embodiments, the power monitor (such as the SMU 210 of FIG. 2 or an off-die power monitor) monitors power draw of the device and uses this information to instruct the job scheduler on how many active power burn kernels to run in a continuous feedback loop. For example, in one embodiment, the power monitor sets a default value for the number of active power burn kernel jobs to run by the job scheduler to a minimum of 0. If power draw is detected as lower than the power limit, the power monitor instructs the job scheduler to start one more active power burn kernels. If power is detected to be at or over the power limit, the power monitor instructs the job scheduler to kill one active power burn kernel. When the job scheduler detects an idle condition (e.g., no driver-initiated jobs running or pending), the job scheduler launches an idle power burn kernel. In various embodiments, the job scheduler notifies the power monitor, SMU or off-die monitor, when the idle power burn kernel is launched.

With reference to FIG. 2, in various embodiments, the operations of block 410 include the command processor 204 as job scheduler, upon receiving a power dip condition signal 212, launching target power workload(s) to the CUs 206. The target power workloads produce meaningless results that are discarded after serving their purpose of performing dynamic work and causing the GPU 202 to consume power. For example, if the GPU 202 was recently burning 325 W of power, and its power draw suddenly drops to 50 W, the SMU 210 or off-die power monitor signals to the command processor 204 that a 300 W power-burn kernel/target power workload should be launched. This helps prevent a 325 W kernel from being followed by a 500 W power-burn kernel and causing a large power spike.

In various embodiments, if new productive work is scheduled, the GPU 202 stops running target power workloads/power burn kernels and begins processing the new productive workload. The operations of method 400 continually repeats to monitor power draw by the GPU 202 to determine whether power dip conditions arise. If the productive workload is insufficient to prevent power dip below the power floor, then the operations of blocks 408 and 410 will launch additional target power workloads as previously described in more detail.

Additionally, such as with respect to FIG. 2, it is not necessary to indefinitely perform target power workloads for the purposes of power burn. In some embodiments, the operations of block 410 include the command processor 204 and the SMU 210 gradually decreasing power usage by running a first power burn kernel of a higher power usage (e.g., a target power workload designed to power burn at 500 W) for a first period of time, switching to a second power burn kernel of a lower power usage (e.g., a target power workload designed to power burn at 400 W), and so forth such as to decrease the amount of power consumed by GPU 202 over time. In other embodiments, the SMU 210 and command processor 204 instruct the CUs 206 to process the same target power workload while walking down the voltage-frequency points at which the GPU 202 operates (e.g., gradually decreases power usage by running the same power-burn kernel), such as by utilizing power management techniques including dynamic voltage and frequency scaling (DVFS) to dynamically adjust an operating voltage and frequency point (referred to as a "p-state") across GPU 202 components during run time.

In this manner, the GPU 202 hardware autonomously starts running power burn workloads when the hardware itself detects changes in power usage falling below the predetermined power floor threshold. Power demand is monitored so that extra power can be consumed (via running of target power workloads) to smooth out power usage or reduce high frequency variations in power draw. Thus, processors on any individual node (e.g., a single GPU) in a full system are instructed to operate at an elevated power level above GPU idle for specified time periods. In this manner, devices are prevented from moving to sleep states and their power sits at an elevated level above that attained at awake-but-idle. The full system power load can thus be gradually raised or lowered down to idle (e.g., may not be desirable to let chip suddenly drop from 500 W to 10 W of power usage over lms but gradually letting the chip lower power usage over a minute helps prevent both high variations in power draw and prevents needlessly consuming power). For example, in various embodiments, the operations of block 410 include firmware controllers utilizing power reduction techniques such as dithering or clock switching to lower things over time—as the GPU 202 continues to be idle, firmware controls use a variety of lower power kernels to walk operations down to idle without encountering a fast power dip.

As will be appreciated, the action time scale of the dynamic system load management described herein is limited only by the time scale of measurement interval, which can include milliseconds or microseconds. Accordingly, as described herein, the system load management allows for processors participating in large-scale jobs to maintain some minimum power usage, whether when the processors are idle or when they are running some low-power workloads, by leveraging existing processor hardware structures and without adding in additional circuitry design changes. In this manner, high frequency variations in power use are smoothed and eases the challenge on local power grids which allows larger datacenters to use a larger number of higher power devices. Additionally, those skilled in the art will recognize that the techniques discussed herein allow for the design of simpler, cheaper power control circuitry as it provides assurances that chip variance in power usage (e.g., smaller di/dt ranges) will be smaller.

A computer readable storage medium includes any non-transitory storage medium, or combination of non-transitory storage media, accessible by a computer system during use to provide instructions and/or data to the computer system. Such storage media include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium include source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   receiving a power floor instruction at a processing device of a datacenter node;
   communicating, based on the power floor instruction, a power dip condition to workload scheduling circuitry of the processor device in response to identifying the power dip condition;
   responsive to the power dip condition, selecting by the workload scheduling circuitry a power burn kernel for execution based on a known power load associated with the selected power burn kernel, wherein selecting the power burn kernel comprises selecting the power burn kernel from multiple power burn kernels that are each associated with a respective known power load, wherein each of the multiple power burn kernels includes a plurality of matrix operations; and
   assigning, based at least in part on the power dip condition, one or more target power workloads for execution at the processor device, the one or more target power workloads including the selected power burn kernel.

2. The method of claim 1, further comprising:
   wherein the power floor instruction indicates at least one of a threshold power floor level and a threshold rate of power change; and
   determining, based at least in part on the power floor instruction, a target power draw to be maintained by the processor device.

3. The method of claim 2, wherein identifying the power dip condition includes a determination by the power monitoring circuitry of the power draw by the processor device falling below the threshold power floor level.

4. The method of claim 3, wherein identifying the power dip condition includes a determination by the power monitoring circuitry of the power draw by the processor device falling below the threshold power floor level at a rate exceeding the threshold rate of power change.

5. The method of claim 2, wherein assigning one or more target power workloads includes the workload scheduling circuitry assigning one or more target power workloads to raise the power draw by the processor device to meet or exceed the target power draw.

6. The method of claim 1, wherein assigning one or more target power workloads includes the workload scheduling circuitry assigning a first target power workload of a first power burn level to be executed for a first period of time, and subsequently assigning a second target power workload of a second power burn level lower than the first power burn level to be executed for a second period of time.

7. The method of claim 1, wherein assigning one or more target power workloads includes assigning a first target power workload to be executed for a first period of time at a first voltage-frequency setting, and subsequently assigning the first target power workload to be executed for a second period of time at a second voltage-frequency setting lower than the first voltage-frequency setting.

8. The method of claim 1, further comprising:
instructing the processor device to cease execution of the selected power burn kernel prior to beginning processing a productive workload.

9. A processor device, comprising:
power monitoring circuitry configured to receive a power floor instruction for a datacenter node that indicates at least one of a threshold power floor level and a threshold rate of power change; and
workload scheduling circuitry communicably coupled to the power monitoring circuitry and configured to, responsive to a power dip condition identified according to the power floor instruction:
select for execution at the processor device one pre-compiled power burn kernel from among multiple power burn kernels based on a respective power load associated with the one power burn kernel, wherein each of the multiple power burn kernels includes a plurality of matrix operations.

10. The processor device of claim 9, wherein the workload scheduling circuitry comprises a command processor configured to launch workloads into one or more compute units of the processor device.

11. The processor device of claim 9, wherein the power monitoring circuitry is configured to monitor a power draw by the processor device and determine, based at least in part on the power floor instruction, a target power draw to be maintained by the processor device.

12. The processor device of claim 11, wherein the power monitoring circuitry is configured to identify the power dip condition based on detecting the power draw by the processor device falling below the threshold power floor level.

13. The processor device of claim 12, wherein the power monitoring circuitry is configured to identify the power dip condition based on detecting the power draw by the processor device falling below the threshold power floor level at a rate exceeding the threshold rate of power change.

14. The processor device of claim 11, wherein the workload scheduling circuitry is configured to assign the selected one power burn kernel for execution to raise the power draw by the processor device to meet or exceed the target power draw.

15. The processor device of claim 11, wherein the workload scheduling circuitry is configured to instruct the processor device to cease execution of the one power burn kernel prior to beginning processing a productive workload.

16. A system, comprising:
one or more processing units communicably coupled to a host processor, each of the one or more processing units corresponding to a datacenter node, wherein a first processing unit includes:
power monitoring circuitry configured to receive a power floor instruction indicative of at least one of a threshold power floor level and a threshold rate of power change; and
workload scheduling circuitry communicably coupled to the power monitoring circuitry and configured to, responsive to a power dip condition identified according to the power floor instruction:
select for execution one power burn kernel from among multiple power burn kernels based on a respective power load associated with the one power burn kernel, wherein each of the multiple power burn kernels includes a plurality of matrix operations; and
discard without use any results generated by the one power burn kernel during execution.

17. The system of claim 16, wherein the host processor is configured to transmit the power floor instruction and the multiple power burn kernels to the first processing unit.

18. The system of claim 16, wherein the power monitoring circuitry is configured to monitor a power draw by the first processing unit and determine, based at least in part on the power floor instruction, a target power draw to be maintained by the first processing unit.

19. The system of claim 18, wherein the power monitoring circuitry is configured to identify the power dip condition exists based on detecting the power draw by the first processing unit falling below the threshold power floor level.

20. The system of claim 19, wherein the power monitoring circuitry is configured to identify the power dip condition exists based on detecting the power draw by the first processing unit falling below the threshold power floor level at a rate exceeding the threshold rate of power change.

* * * * *